United States Patent [19]

Wiley

[11] 4,428,648
[45] Jan. 31, 1984

[54] TRANSPARENCY VIEWING DEVICE

[76] Inventor: Richard H. Wiley, 983 Lake Front Rd., Lake Oswego, Oreg. 97034

[21] Appl. No.: 324,856

[22] Filed: Nov. 25, 1981

[51] Int. Cl.³ .............................................. G02B 27/02
[52] U.S. Cl. .................................... 350/238; 350/239
[58] Field of Search ................ 350/141, 143, 235–241, 350/238–239, 242–245, 246–248, 250, 141; 40/361, 367, 362–366; 434/90, 428

[56] References Cited

U.S. PATENT DOCUMENTS

| 709,415 | 9/1902 | Lewis | 350/239 |
|---|---|---|---|
| 1,350,042 | 8/1920 | Stealy | 40/361 |
| 1,463,624 | 7/1923 | Mabee | 40/367 |
| 1,602,347 | 10/1926 | Eustace | 40/361 |
| 2,602,366 | 7/1952 | De Liso | 350/238 |
| 2,657,487 | 11/1953 | Sprung | 350/241 |
| 3,663,096 | 5/1972 | Fuller | 350/238 |
| 3,936,156 | 2/1976 | Shaw et al. | 350/235 |
| 4,094,598 | 6/1978 | Hodges | 350/241 |

FOREIGN PATENT DOCUMENTS

| 250051 | 10/1966 | Austria | 350/143 |
|---|---|---|---|
| 693475 | 11/1930 | France | 350/143 |
| 964850 | of 1950 | France | 350/236 |
| 785843 | 11/1951 | United Kingdom | 350/239 |

Primary Examiner—William H. Punter
Attorney, Agent, or Firm—James D. Givnan, Jr.

[57] ABSTRACT

A transparency viewing device includes a floor supported stand which is vertically adjustable to locate a horizontal arm and a housing thereon at the desired elevation. The housing within which the transparency or color slide is temporarily positioned includes a light diffuser to illuminate the slide which is viewed through a housing supported lens. A reflector is carried by a housing platform in a manner permitting in a wide range of universal adjustment for purposes of reflecting available light rays toward the diffuser. A more powerful magnification lens may be substituted for the first mentioned lens and is supported adjacent a front wall of the housing for magnification of a slide also in place on the housing front wall. The housing is removable from the stand for use as a hand held slide viewer.

8 Claims, 7 Drawing Figures

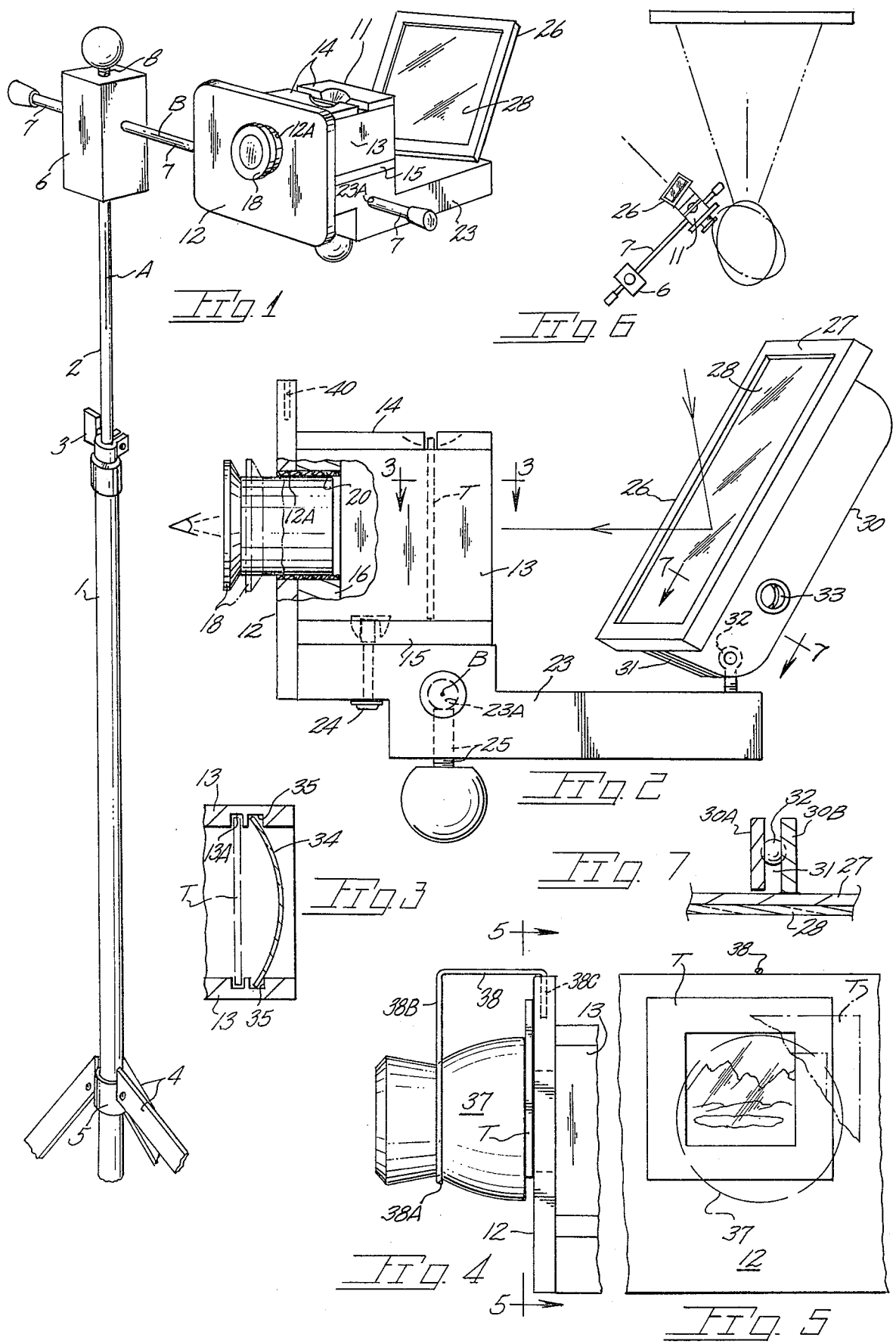

TRANSPARENCY VIEWING DEVICE

BACKGROUND OF THE INVENTION

The present invention concerns generally a device for holding a transparency such as a 35 millimeter slide for convenient viewing of same by an artist and others who wish to use the transparency as a reference for an artistic or other effort.

Known in the prior art are hand held devices for the viewing of transparencies which devices may include a battery powered or plug in light source or rely simply on reflected light. Typically, such devices are quite small being intended for holding in one hand. Examples of such slide viewings are disclosed in U.S. Pat. Nos. 2,654,173 and 2,602,366. Both of the patented devices include mirrors positionable in one plane to direct light toward the back side of the transparency. Further, the patented devices include light diffusers consisting of a translucent material which tend to provide a more uniform lighting of the transparency. The latter patent additionally includes a lens which is adjustably mounted to permit focusing of same.

Battery powered viewers are impractical when used over long periods while plug in viewers are awkward to use. Both tend to furnish dim light of poor color quality.

U.S. Pat. No. 709,415 discloses an apparatus on which an illustration may be supported to permit copying of same by an artist. The apparatus includes a magnifying lens which is positionable relative to the illustration for purposes of enlarging areas of the copied illustration.

The known prior art devices are clearly not suited for use by one engaged in the artistic reproduction of a transparency as they require, or are at least intended for, holding within one or both hands. No provision is made for the optimum stationary positioning of the viewer with respect to a seated or standing user nor is provision made for utilizing whatever source of illumination is at hand.

The use of slide projectors is unsatisfactory by reason of heat damage and fading of the slide as well as the consumption of costly projector lamps. Further, the projection of slides causes same to be "washed out" by room light. Color prints as a reference are costly and of varying color reliability.

SUMMARY OF THE PRESENT INVENTION

The present invention is embodied within a positionable transparency viewing device in combination with a stand which permits positioning of a transparency for convenient, repeated viewing by the artist. An adjustable stand and stand supported arm contribute toward providing a viewing device readily adjustable to best suit the artist and the available light source.

A transparency or slide is displayed by the device in a precisely located manner with the artist having free use of both hands. Viewing of the slide by the artist accordingly entails but a minimum of head movement important from the aspect of both time saving and minimum interference with the artistic endeavor.

The present viewing device is supported by an adjustable stand with a stand arm on which a viewer housing is horizontally adjustable. Accordingly, the viewing device is adjustable along and about multiple axes to provide precise positioning of the viewer housing through a wide range of positions to best suit the standing or sitting artist. Slides or transparencies offer the most accurate pictorial references both from color and detail standpoints.

Important objectives of the present invention include the provision of a viewing device for disposition closely adjacent an artist's work site to permit convenient periodic reference to a transparency within the device so as to provide slide viewing at the eye level with the least amount of physical effort; the provision of a viewing device wherein a mirror is fully and independently positionable from a slide holding housing so as to direct available reflected light rays onto a diffuser and thence toward the transparency; the provision of a transparency viewing device which has a removable lens to permit the substitution of a more powerful magnifier which permits closer scrutiny of a particular portion of the transparency of interest to the artist.

BRIEF DESCRIPTION OF THE DRAWING

In the accompanying drawing

FIG. 1 is a perspective view of the present viewing device with the lower portion of same broken away for purposes of illustration;

FIG. 2 is a side elevational view of the viewer housing in place on a platform of the viewer which additionally supports an adjustable mirror;

FIG. 3 is a horizontal sectional view taken along line 3—3 of FIG. 2;

FIG. 4 is a fragmentary side elevational view of the viewer housing with a magnifier in place thereon for magnification of a transparency disposed between the housing and the magnifier;

FIG. 5 is a vertical sectional view taken along line 5—5 of FIG. 4;

FIG. 6 is a plan view of the present device with a user's head shown in schematic fashion along with a surface on which the art work is being performed; and FIG. 7 is a sectional view taken along line 7—7 of FIG. 2.

DETAILED DESCRIPTION OF THE PREFERRED EMBODIMENTS

With continuing attention to the drawing, the reference numeral 1 indicates a stand having a tubular base within which is telescopically mounted an extension 2 lockable relative said base by a lock component 3. The lower end of base 1 receives a collapsible leg arrangement at 4 or the well known type commonly found in stands used for photographic purposes. Legs 4 may swing into parallel disposition with the stand base coincident with upward positioning of a leg connecting sleeve 5 upwardly along base 1. A second sleeve (not shown) is fixed to the lower end of base 1 and serves to pivotally attach the legs by interconnecting links. An arm mounting block 6 is affixed to the uppermost end of telescopic member 2.

Block 6 is horizontally bored to receive an arm at 7 which is slidably received within block 6 and lockable by means of a knob bearing threaded shaft 8 extending downwardly through the block into arm contact. Arm 7 may be raised or lowered by adjustment of member 2 or rotated about axis A of said member.

With joint attention to FIGS. 1 and 2, the reference numeral 11 indicates a viewer housing defined by a face plate 12, a pair of sidewalls 13, a slotted top wall 14 and a bottom wall 15. The front face 12 is apertured at 12A as is a block 16 for the purpose of slidably receiving a lens carrying eyepiece 18 and is adjustable axially for the purpose of focusing the viewer's sight on a transparency or slide indicated at T. The remaining eye of the viewer is blocked by plate 12. A liner 20 may be of felt material to provide adequate frictional engagement with the eyepiece barrel to prevent accidental movement of the eyepiece. With attention to FIG. 3, it will be seen that the housing sidewalls 13 define a pair of opposed vertical grooves 13A which receive the side edges of the transparency when in position.

A platform at 23 is adjustably carried by arm 7 and in turn carries housing 11 secured in place thereon by a fastener assembly 24. The platform is transversely bored at 23A to receive arm 7 with a knob equipped set screw at 25 being positionable into arm engagement for locking of the platform into place both along and about axis B of said arm. The rearward portion of the platform serves to support a mirror assembly 26 including a frame 27 about a mirror 28. A mirror support 30 is centrally disposed on the back side of frame 27 and is bifurcated for a major portion of its length to provide legs 30A-30B (FIG. 7) which define a lengthwise orientated opening 31 within which is received a mounting ball 32. Leg 30A is not secured directly along its full length to the mirror frame hence nut and bolt fastener assembly at 33 permits clamping displacement of a segment of leg 30A against ball 32 to permit universal adjustment of the mirror and subsequent locking of same in place. Accordingly the source of light may be from various directions without repositioning of the entire device.

With attention to FIG. 3, it will be seen that light rays reflected by mirror surface 28 pass through a diffuser at 34 which may be a sheet of pliable acetate having a frosted appearance, the diffuser is flexed with the sides of same conveniently retained in place within grooves 35 formed within sidewalls 13 of the housing 11.

With attention to FIG. 6, typical use of the present viewer device will entail the positioning of housing 11 so as to be proximate the user's eye level whether the user is seated or standing and thereafter permits repeated reference to the transparency by a minimum of head movement approximately 45 degrees or so from a forward position whereat the work surface is viewed. In the painting of a work of art using a transparency as a reference it is highly desirable that the transparency be located for ready reference without necessitating the use of either of the user's hands, which are normally occupied, or without a wide range of head movement.

Provision is made for increased magnification of a transparency per the views of FIGS. 4 and 5 wherein a magnifying lens holder at 37 of eight power or so is temporarily supported in place on housing 11 by means of a wire bracket 38. The transparency or slide is removed from the housing and placed on the front wall 12 thereof over the sight opening 12A. Bracket 38 has a circular portion 38A encircling the lens holder 37 with upright segments at 38B and 38C the latter insertable within a recess 40 in the upper edge of front wall 12 of the housing. The lens is accordingly supported in a semi-cantilever manner with the lens bearing inwardly against the slide to frictionally retain same in place. The slide may then be moved about to center that area of the slide of present interest in front of lens 37.

While I have shown but a few embodiments of the invention it will be apparent to those skilled in the art that the invention may be embodied still otherwise without departing from the spirit and scope of the invention.

Having thus described the invention, what is desired to be secured under a Letters Patent is:

1. A transparency viewing device for supporting a transparent color slide at eye level, said device comprising in combination,
    a stand having floor engaging feet and a vertically adjustable member, a horizontal arm carried by said member,
    a platform adjustably mounted on said arm,
    a housing on said platform, said housing adapted to receive a transparency, said housing including a lens through which the transparency may be viewed, a light diffuser within said housing,
    a reflector mounted on said platform and offset from said housing to enable the directing of light rays onto said diffuser, and
    mounting means carried by said platform and offset from said housing and mounting said reflector thereon in a universal manner to facilitate the direction of light rays from various directions onto said diffuser.

2. The viewing device claimed in claim 1 wherein said platform is positionable both horizontally from and about the vertical axis of the vertically adjustable member of the stand.

3. The viewing device claimed in claim 2 wherein said platform additionally includes threaded means for seated engagement with the stand arm.

4. The viewing device claimed in claim 3 wherein said reflector includes opposing leg members in frictional engagement with said mounting means one of said leg members being partially displaceable, a fastener assembly for biasing said one of said leg members.

5. The viewing device claimed in claim 1 wherein said lens is detachable from said housing, said device additionally including a magnifier lens, a bracket engageable with said housing and supporting the magnifier lens exteriorly of the housing subsequent to removal of the first mentioned lens for greater magnification of the transparency, said magnifier lens adapted to frictionally retain the transparency in place on the housing exterior.

6. A transparency viewing device comprising in combination,
    a housing adapted to receive a transparency, said housing including a lens through which the transparency may be viewed, a light diffuser within said housing,
    a platform supporting said housing,
    a reflector carried by said platform in an adjustable manner so as to enable the directing of light rays toward said housing and onto said diffuser, and
    universal mounting means on said platform and mounting said reflector thereon in a universal manner to facilitate the directing of reflected light rays from a wide range of directions onto said diffuser.

7. The viewing device claimed in claim 6 wherein said reflector includes opposing leg members in frictional engagement with said mounting means, one of said leg members having a displaceable segment, a fastener assembly for biasing said segment.

8. The viewing device claimed in claim 6 wherein said lens is detachable from said housing, said device additionally including a magnifier lens, a bracket engageable with said housing and supporting the magnifier lens exteriorly of the housing subsequent to removal of the first mentioned lens for greater magnification of the transparency, said magnifier lens adapted to frictionally retain the transparency in place on the housing exterior.

* * * * *